May 8, 1951 — I. L. LOPATA — 2,552,195
EMULSIFIER DEVICE
Filed Oct. 25, 1946
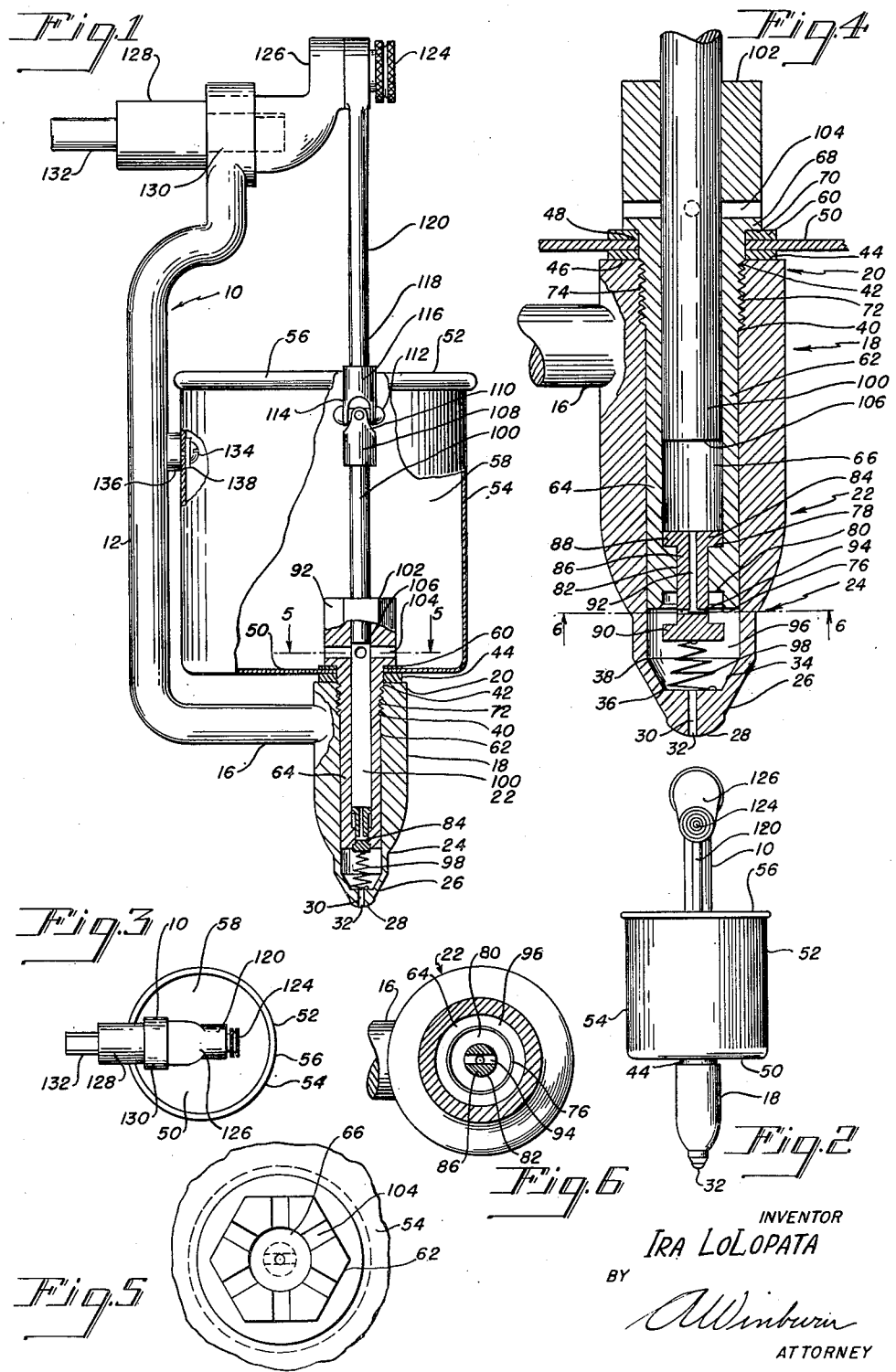
INVENTOR
IRA LoLOPATA
BY
A. Winburn
ATTORNEY Patented May 8, 1951

2,552,195

UNITED STATES PATENT OFFICE 2,552,195

EMULSIFIER DEVICE

Ira L. Lopata, Elizabeth, N. J.

Application October 25, 1946, Serial No. 705,686

8 Claims. (Cl. 259—47)

This invention relates to homogenizing and emulsifying devices.

An object of the invention is to provide a device which includes a container for ingredients to be homogenized or emulsified, and having novel means for operating upon said ingredients to emulsify the same.

Another object of the invention is to provide a homogenizing and emulsifying device which has in combination a cylinder having a restricted discharge outlet, means for drawing ingredients into said cylinder, and novel means for forcing the ingredients through said discharge outlet under pressure whereby they are homogenized and emulsified.

A further object of the invention is to provide a device which may be employed in the home or bake shop for producing cream from selected ingredients which shall be suitable for whipping or beating in the usual manner.

Still another object of the invention is to provide a device of the character described which may be operated from power derived from an electric motor or which may be attached to and derive its power from standard mixing equipment and include a reciprocating piston movable in a cylinder for operating upon selected ingredients to force them through a restricted opening in a housing, thereby forming cream suitable for whipping.

Another object of the invention is to provide a homogenizing and emulsifying device for producing cream for whipping and for other similar uses, which is simple in design, relatively inexpensive to manufacture, effective in operation, and sanitary in use.

Other objects and advantages of the invention will become apparent from the following description of a preferred embodiment thereof as illustrated in the accompanying drawings, and in which Fig. 1 is an elevational view of my improved homogenizing and emulsifying device, the view being partly broken out to show the construction thereof;

Fig. 2 is a reduced side elevational view of the device as seen from the right of Fig. 1;

Fig. 3 is a reduced top plan view of the device shown in Fig. 1;

Fig. 4 is an enlarged fragmentary sectional view of the lower portion of the device shown in Fig. 1;

Fig. 5 is a cross-sectional view taken on the line 5—5 of Fig. 1;

Fig. 6 is a cross-sectional view taken on the line 6—6 of Fig. 4.

In order that the invention may be clearly understood, reference may now be had to the drawings, in which like reference characters denote similar parts throughout the several views. As shown, there is support bracket 10 having a substantially vertical post 12 in the lower end portion of which is bent at right angles to form a substantially horizontal leg or extension 16. The right hand end portion of the leg 16 is joined to or formed integral with an outer casing 18.

The outer casing 18 which is substantially vertical as illustrated, and perpendicular to the arm 16, forms the homogenizer head casing as will be further explained below. The casing 18 is of one-piece construction and has substantially cylindrical outer surfaces between locations 20 and 22 as seen in Fig. 4, its outer surface then converging to location 24, and thence converging gradually to location 26, being thence rounded somewhat as shown to form the lowermost tip end 28 of the casing 18.

It will be observed that the casing 18 has an axial bore 30 extending through its lowermost or tip portion, thus forming a constricted discharge outlet mouth 32 through which the product of the device is extruded or discharged into a suitable container or otherwise, as desired. The casing 18 has its axial bore enlarged at 34 to form a conical inner surface between locations 36 and 38, being thence upwardly substantially cylindrical to location 40 at which point the cylindrical interior of the bore is threaded to the uppermost end portion 42 of the casing head 18.

An annular sealing washer 44 of any suitable resilient material such as rubber or the like, rests upon the upper end shoulder 46 of the casing head 18 as shown, the washer 44 having its upper surface abutting against the lower marginal surface of an aperture 48 formed in the bottom portion 50 of a container 52 which is thus supported upon the washer 44. The container 52 is formed of metal or other suitable non-corrosive material, and has an upstanding substantially cylindrical side wall 54 terminating in an upper rim 56 which is rounded or beaded as shown, thus defining an inner chamber or recess 58 which is upwardly open for the reception of suitable selected ingredients which when operated upon by the device described herein will be emulsified to produce a cream product suitable for whipping or for other similar purposes.

An upper annular sealing washer 60 rests upon the uppermarginal surface of the aperture 48 formed in the container bottom 50, as best shown in Fig. 4. A cylinder lining member 62, having cylindrical side walls 64 defining an axial bore 66, extends downwardly through the washers 60 and 44 and the aperture 48 in the container bottom 50, the annular enlargement 68 at the top of the lining member 62 forming a liner shoulder 70 which rests upon the upper surface of the upper washer 60. The liner 62 is externally threaded at 72 for engagement with corresponding internal threads 74 in the upper portion of the axial bore 66 of the casing head 18.

The liner 62 extends downwardly inside the axial bore in the casing head to location 76 as best shown in Fig. 4, the walls of the liner being thickened between locations 78 and 80 to form a reduced axial bore 82 therebetween, shoulders being thus formed at locations 78 and 80 as shown. A valve member 84 has a cylindrical body portion 86 slidably disposed in the reduced bore 82, the portion 86 of the valve being longer than the reduced bore 82 as illustrated. The valve member 84 has upper and lower enlargements or collars 88 and 90 respectively, the outside diameter of which is almost as great as the inside diameter of the bore 66 in the cylinder liner 62, but not great enough to interfere with easy sliding motion of the collars in the bore.

The valve member 84 has an axial bore 92 extending downwards only to a point slightly above the lower collar 90 as shown, the valve body portion 86 having a number of radial bores 94 which radiate from the axial bore 92 to afford communication between the axial bore 92 and the outside of the valve body. It will be observed thus, as seen in Fig. 4, that the valve member 84 is slidably movable vertically between two positions. The first of these is the one shown in Fig. 4, that is, the lowermost position of the valve, where its upper collar rests upon the shoulder 78 of the cylinder liner 62, the outer openings of the apertures 94 in the valve being well below the lower shoulder 80, so as to allow free communication through the bores 92 and 94, between the upper cylinder chamber 66 above the valve member 84, and the lower discharge chamber 96 formed in the lower end portion of the casing head 18.

If desired, the valve member 84 may be biased upwardly toward its uppermost position, by means of a conical spring 98, the upper end of which may be connected to the valve 84 and the lower end of which may be connected to the floor of the discharge chamber 96, in any suitable manner as by rivets, or the spring may merely rest in the position described. A piston or plunger 100, having an outside diameter very slightly less than the diameter of the bore 66, is slidably disposed in the said bore, thus extending into the cylinder liner or bushing 62 which extends upwards to location 102. The enlarged portion of the cylinder liner or bushing 62 is hexagonal as seen in Fig. 5 for ease of turning with a wrench, and is provided with a number of radial apertures 104 which thus furnish communication between the inside of the bore 66 and the ingredient chamber 58 of the tank 52, when the piston 100 is elevated with its lower end 106 wholly above the plane of the apertures 104, as shown in Fig. 1 and in Fig. 5.

The piston 100 is connected at its upper end to a universal joint including a bushing 108 the bifurcated upper end 110 of which pivotally engages a lateral pin member 112 which extends pivotally through apertures formed in the bifurcated lower end 114 of an upper bushing 116 carried on the lower end 118 of a connecting rod 120. The upper end of the rod 120 has an aperture formed therein for the pivotal reception of a pin or bolt 124 upon which the rod 120 is supported, the pivot pin 124 being carried by the outer end of a crank arm 126. The crank 126 has its inner end joined to or formed integral with a rotatable drive shaft 128 which is journaled in a bearing 130 formed in the upper end of the bracket 10.

The end 132 is reduced and suitably formed for engagement with a chuck or coupling device carried on the rotatable drive shaft of a motor, not shown, by means of which the device may be actuated, or by attachment to a standard mixing equipment.

As shown in Fig. 1, the container 52 is secured to the upright portion 12 of the support bracket 10 by means of a bolt 134 extending through an aperture in the wall of the container and into a threaded aperture formed in the boss 136 in the portion 12 of the bracket, a suitable washer 138 of leather or other material being disposed as shown to form a seat for the bolt head inside the container 52.

To operate the device, suitable ingredients, known in the art, are placed into the hopper or chamber 58 inside the container 52, and the drive motor is started, causing the piston 100 to reciprocate vertically inside the cylinder bore 66. Assuming the piston to be in its lowermost position, as shown in Fig. 4, it will commence its upward travel, allowing the spring 98 to press the valve member 84 upwards to its uppermost position with the upper surface of the lower collar 90 bearing against the shoulder 80, thus moving the radial apertures 94 upwards inside the reduced bore 82, and blocking communication between the cylinder bore 66 and the discharge chamber 96.

The piston, moving upwards under the influence of the crank 126, creates a vacuum inside the cylinder bore 66, and as the piston continues its upward travel it reaches and passes the plane of the communicating apertures 104, thus allowing the suction to act upon the mixture of ingredients in the tank 52, drawing such ingredients through the apertures 104 into the cylinder chamber 66. Upon the down stroke of the piston, these ingredients are compressed downwardly in the cylinder thereby forcing the valve 86 downwards, uncovering the ports 94, and allowing the mixture in the cylinder to be forced downwardly under pressure through the bore 92 and the apertures 94, into the discharge chamber 96 from which they are forced downwards to be discharged from the casing head through the discharge outlet 32, being homogenized or emulsified in the process. It will be observed that my improved device includes a casing head 18 which is formed in one piece, with corresponding advantages, including ease of manufacture, and assembly and disassembly as needed.

It is also noted that due to the specific construction of my device as above described, the same may be readily cleaned by simply forcing hot water through the valve bores 92 and 94 and through the bore 30.

Although I have described a preferred embodiment of my invention in specified terms, it is to be understood that various changes may be made in size, shape, materials and arrangement without departing from the spirit and scope of the invention as claimed.

Having described my invention, what I claim and desire to secure by Letters Patent is:

1. A homogenizer for making cream and other similar products from selected ingredients, the said cream being suitable for whipping, comprising a container to receive said selected ingredients, outlet means for said homogenized products, duct means communicating with said container and said outlet means, and means comprising a sliding valve in said duct means and interposed between said container and said outlet means for operating upon said selected ingredients to form said homogenized products, said valve having a constricted opening therein so disposed that said selected ingredients must pass therethrough before being discharged through said outlet means, said valve having upper and lower enlargements to limit the axial sliding movement thereof in two directions.

2. A homogenizing and emulsifying device comprising a frame, container means carried on said frame for receiving a mixture of selected ingredients, duct means for receiving said ingredients from said container means, said duct means having a restricted discharge outlet, compression means carried by said frame and operable upon said ingredients to force them through said duct means and said discharge outlet to be homogenized in the process, a valve interposed between said container and said discharge opening, said valve having a constricted opening therein so disposed that said selected ingredients must pass therethrough before being discharged through said discharge outlet, and means for driving said compression means, said valve being axially slidable in said duct means and having upper and lower enlargements to limit the axial sliding movement thereof in two directions.

3. A homogenizing and emulsifying device comprising a frame, container means carried on said frame for receiving a mixture of selected ingredients, duct means for receiving said ingredients in predetermined quantities from said container means, said duct means comprising one piece outer wall casing and having a restricted discharge outlet, a valve interposed between said container and said discharge opening, said valve having a constricted opening therein so disposed that said selected ingredients must pass therethrough before being discharged through said discharge outlet, compression means carried by said frame and operable upon said ingredients to force them through said duct means and said discharge outlet to be homogenized in the process, and means for automatically operating said compression means, said valve being axially slidable in said duct means and having upper and lower enlargements to limit the axial sliding movement thereof in two directions.

4. A homogenizing and emulsifying device comprising a frame, a container carried on said frame for receiving selected ingredients, cylinder means carried on said frame, duct means communicating between said cylinder means and said container for permitting said ingredients to move from the container into the cylinder in predetermined quantities, restricted discharge outlet means on said cylinder means, piston means movable in said cylinder means to force said ingredients in the cylinder means through said restricted discharge outlet, a valve interposed between said container and said discharge opening, said valve having a constricted opening therein so disposed that said selected ingredients must pass therethrough before being discharged through said discharge outlet, whereby said ingredients are homogenized and whipped in the process and means for attaching said device to a source of power for operation, said valve being axially slidable in said duct means and having upper and lower enlargements to limit the axial sliding movement thereof in two directions.

5. A homogenizing and emsulifying device comprising a frame, a container carried on said frame for receiving selected ingredients, cylinder means carried on said frame, duct means communicating between said cylinder means and said container, suction means for drawing said ingredients from said container into said cylinder means, restricted discharge outlet means on said cylinder means, piston means movable in said cylinder means to force said ingredients in the cylinder means through said restricted discharge opening, a valve interposed between said container and said discharge opening, said valve having a constricted opening therein so disposed that said selected ingredients must pass therethrough before being discharged through said discharge outlet, whereby said ingredients are homogenized and whipped, and means for attaching said device to a standard mixing machine for automatic operation therewith, said valve being axially slidable in said duct means and having upper and lower enlargements to limit the axial sliding movement thereof in two directions.

6. A homogenizing and emulsifying device comprising a frame, a container carried on said frame for receiving selected ingredients, cylinder means carried on said frame, duct means communicating between said cylinder means and said container, suction means for drawing said ingredients from said container into said cylinder means, restricted discharge outlet means on said cylinder means, a valve interposed between said container and said discharge opening, said valve having a constricted opening therein so disposed that said selected ingredients must pass therethrough before being discharged through said discharge outlet, piston means movable in said cylinder means to force said ingredients in the cylinder means through said valve opening and said restricted discharge opening for homogenizing the same, a rotatable drive shaft journaled in the said frame for being rotated by means of power derived from a motor and the like, and mechanical linkage means operating between said drive shaft and said piston for reciprocating the piston in the cylinder means upon rotary motion of the drive shaft, said valve being axially slidable in said duct means and having upper and lower enlargements to limit the axial sliding movement thereof in two directions.

7. A device for producing cream suitable for whipping and the like from selected ingredients, comprising a frame, a receptacle carried on said frame for receiving selected ingredients, a housing on said frame, said housing having a bore extending therethrough with a constricted discharge outlet formed in the lower end of the bore, a hollow bushing engaging said housing and extending into the bore therein, said bushing having an axial cylinder bore, said cylinder bore having a reduced axial bore portion communicating at its lower end with the bore in said housing, duct means communicating between said receptacle and the said cylinder bore in said bushing, suction means for drawing said ingredients from said receptacle through said communicating means into said cylinder bore, piston means movable in said cylnder bore to force said ingredients in the cylinder downward and through said discharge outlet for homogenizing the same, movable valve means slidably operating in said reduced axial bore portion of said cylinder bore, said valve means comprising a member having upper and lower enlargements to limit the axial sliding movement thereof in both directions, said valve means being normally biased to block communication between said cylinder bore and said discharge outlet in the housing, said valve means comprising a valve body having a relatively small through opening so disposed that said selected ingredients must pass therethrough before being discharged through said discharge outlet and means for attaching said device to a driven member for effective operation therewith.

8. A device for producing homogenized and emulsified products from selected ingredients, comprising a frame, a receptacle on said frame for receiving said ingredients, a one piece homogenizer head casing carried on said frame and having a bore extending therethrough, the lower end of said bore being reduced to form a restricted discharge outlet, said receptacle having a discharge aperture formed in the floor thereof, a cylinder liner bushing extending through said discharge aperture with its lower end portion engaging said head casing and extending into the said bore therein, said bushing having an axial cylinder bore extending therethrough said cylinder bore having a reduced axial bore portion, said bushing having lateral aperatures formed in its upper walls for communicating between said receptacle and said cylinder bore, a piston reciprocally movable in said cylnder bore and so arranged as to block communication through said lateral apertures at all times except when said piston is almost wholly retracted out of said cylinder bore, a valve slidably operating in said reduced axial bore portion of said cylinder bore and having communicating ducts extending therethrough for providing communication between the said cylinder bore and said restricted discharge outlet, said communicating ducts comprising a vertically disposed portion and radial portions, said valve having upper and lower enlargements to limit the axial sliding movement thereof in both directions, resilient means normally biasing said valve into closed position wherein said radial portions of said communicating ducts are blocked, whereby upward movement of said piston, a vacuum is created in said cylinder bore, and upon passage of said piston above the plane of said lateral bushing apertures the said ingredients, under the influence of said vacuum, are drawn from the receptacle into the cylinder bore, and upon downward movement of the piston said ingredients are forced downwards, moving said valve to unblocked position to force said ingredients out of said casing head through said restricted discharge outlet, whereby they are homogenized and emulsified, means for operating said piston, said last named mans including means for attaching said device to a driven member for effective operation whenever said driven member is in operation.

IRA L. LOPATA.

REFERENCES CITED

The following references are of record in the file of this patent:

UNITED STATES PATENTS

| Number | Name | Date |
|---|---|---|
| 2,124,580 | Lavine | July 26, 1938 |
| 2,144,994 | Olson | Jan. 24, 1939 |
| 2,397,281 | MacEwing | Mar. 26, 1946 |

FOREIGN PATENTS

| Number | Country | Date |
|---|---|---|
| 513,197 | Great Britain | Oct. 5, 1939 |